United States Patent [19]
Itsuzi et al.

[11] Patent Number: 5,219,584
[45] Date of Patent: Jun. 15, 1993

[54] MOLD OPENING/CLOSING CONTROL APPARATUS

[75] Inventors: Yoshiyasu Itsuzi; Tateo Yakata, Chiba, both of Japan

[73] Assignee: Suitomo Heavy Industries, Ltd., Japan

[21] Appl. No.: 751,962

[22] Filed: Aug. 29, 1991

[30] Foreign Application Priority Data

Nov. 6, 1990 [JP] Japan .................................. 2-299015

[51] Int. Cl.$^5$ ............................................ B29C 45/80
[52] U.S. Cl. .................... 425/150; 264/405; 425/589
[58] Field of Search ............ 425/150, 589, 590, 450.1, 425/451.9; 264/40.5

[56] References Cited

U.S. PATENT DOCUMENTS 4,992,036  2/1991  Herdtner et al. ................. 425/150
5,052,910  10/1991  Hehl ................................ 425/150

FOREIGN PATENT DOCUMENTS 3-47717  2/1991  Japan .

*Primary Examiner*—Tim Heitbrink
*Attorney, Agent, or Firm*—Lorusso & Loud

[57] ABSTRACT

An oil circuit in which a meter-in circuit and a differential circuit are combined is disposed. Oil is supplied from a variable capacity pump in order to make a mold opening/closing control apparatus operate. A position instruction signal obtained by integrating a velocity instruction signal and a positional deviation of the displacement of the mold opening/closing control apparatus are obtained. A flow-rate instruction signal is set by the positional deviation. Then, a differential switching determining section receives the positional deviation and determines differential switching, following which a differential change-over valve switches between the meter-in circuit and the differential circuit. With a gain switching section connected to the differential switching determining section, the gain switching section switches between a pump gain for the meter-in circuit and a pump gain for the differential circuit. The above variable capacity pump is controlled by the switched pump gain. A fixed capacity pump may be connected to the variable capacity pump and used. In such a case, switching between un-load and on-load is performed in response the reception of a flow-rate instruction signal from the gain switching section.

14 Claims, 7 Drawing Sheets

MOLD OPENING/CLOSING CONTROL APPARATUS

BACKGROUND OF THE INVENTION

1. Field of the Invention

The present invention relates to a mold opening/closing control apparatus for an injection molding machine.

2. Description of the Related Art

In a conventional injection molding machine, resin which is heated in a heating cylinder and fluidized is injected into a mold at a high pressure, cooled therein so as to solidify or harden, and then the mold is opened and a molded product is removed. The injection molding machine has a mold clamping apparatus by means of which a mold is opened or closed and mold clamping is performed so that molten resin will not leak during the time of injection.

There are two types of the above-described mold clamping apparatus: a toggle type mold clamping apparatus in which a force generated by a hydraulic cylinder or a motor is amplified by a combination of links of toggle joints, and thus a large mold clamping force can be obtained; and a straight hydraulic type mold clamping apparatus in which a clamping force is directly generated by oil supplied to a mold clamping cylinder.

A mold clamping cylinder and a mold opening/closing cylinder are disposed in the straight hydraulic type mold clamping apparatus. From the necessity of improving molding efficiency, mold opening/closing is performed at a high speed in a mold opening/closing cylinder. However, when mold closing is performed at a high speed, a movable metal mold could strike a fixed metal mold due to the inertial force of the movable platen, the movable metal mold or the like when the mold closing is terminated. When mold opening is performed at a high speed, a movable platen could strike a mold clamping cylinder by an inertial force similar to that described above. Accordingly, position control for a mold opening/closing cylinder is performed by a hydraulic control valve.

That is, an electromagnetic change-over valve for selectively supplying oil to either of the oil chambers of the mold opening/closing cylinder is disposed. A variable capacity pump is connected to one of the oil chambers of the electromagnetic selecting valve, and an electromagnetic proportional flow-rate control valve is connected to the other oil chamber. Thus, by controlling the variable capacity pump and the electromagnetic proportional flow-rate control valve, position control for a mold opening/closing cylinder is performed.

In this case, a certain degree of mold releasing force is required during an initial period of releasing the mold. A maximum discharge amount of the variable capacity pump can be determined as described below. That is, the setting of a system pressure determines the pressure area of the mold opening/closing cylinder. Therefore, a maximum discharge amount of the variable capacity pump can be determined by a product of the above-mentioned pressure area and a required maximum speed.

However, a large releasing force is required only during an initial, short period. The load while the mold opening/closing cylinder is moved at a high speed after the mold opening is started is small. Hence, a differential circuit equivalent to the changing of a pressure area can be used. As a result, a variable capacity pump having a small maximum discharge amount can be used, and therefore costs can be reduced.

FIG. 1 is a view showing a mold opening/closing control apparatus in which a differential circuit is used.

In FIG. 1, reference numeral 31 denotes a cylinder in which a mold clamping cylinder and a mold opening/closing cylinder are made in one piece (hereinafter referred to as a mold clamping cylinder). A piston 32 is slidably disposed inside the cylinder. A large-diameter rod 33 and a small-diameter rod 34 are projected and formed on both sides of the piston 32. The large-diameter rod 33 is connected to a movable metal mold via a movable platen (not shown). The piston 32 reciprocates by the operation of the mold clamping cylinder 31, and mold opening/closing and mold clamping are performed.

An oil chamber 35 is formed in the end surface of the small-diameter rod 34 of the piston 32. Oil is supplied to the oil chamber 35 in a case where the movable platen is moved to a fixed platen at the time of closing the mold. An oil chamber 36 is formed in the large-diameter rod 33 of the piston 32. Oil is supplied to the oil chamber 36 in order to separate the movable platen from the fixed platen at the time of opening the mold. In addition, an oil chamber 37 for clamping the mold is formed in the small-diameter rod 34 of the piston 32 and also in the end surface of the piston 32.

Reference numeral 38 denotes an electromagnetic change-over valve by means of which switching is performed by the actuation of solenoids a and b. The ports of the electromagnetic change-over valve 38 are individually connected to the oil chambers 35 and 36 inside the mold clamping cylinder 31, a variable capacity pump 39, an electromagnetic change-over valve 45, and an electromagnetic proportional control valve 40. The electromagnetic change-over valve 38 goes into position I if the solenoid a is driven and into position II if the solenoid b is driven. Position N is a neutral position. At position I, oil discharged from the variable capacity pump 39 is supplied to the oil chamber 35 inside the mold clamping cylinder 31, causing the movable platen to move in the rightward direction via the large-diameter rod 33 and causing the mold to be closed. At position II, oil discharged from the variable capacity pump 39 is supplied to the oil chamber 36 inside the mold clamping cylinder 31 via oil passage 48, causing the movable platen to move in the leftward direction via the large-diameter rod 33 and causing the mold to be opened. At position N, a spool is placed in a neutral position, and the mold clamping cylinder 31 stops.

Reference numeral 39 denotes a variable capacity pump, in which the inclined rotational angle of a swash plate is changed by an instructed signal, whose amount of discharge is changed in proportion to the signal. Reference numeral 40 denotes an electromagnetic proportional flow-rate control valve which is electrically controlled by the solenoid a and by means of which a flow rate is proportionally controlled by an electrical signal. The electromagnetic proportional flow-rate control valve 40 constitutes a meter-out circuit by which control is made possible by the oil chamber 36. By controlling the electromagnetic proportional flow-rate control valve 40, the amount of oil discharged from the oil chambers 35 and 36 inside the mold clamping cylinder 31 is regulated, exerting a braking action on the piston 32 of the mold clamping cylinder 31.

Reference numeral 41 denotes an electromagnetic change-over valve which goes to positions I and II by the actuation of the solenoid a. At position I, the electromagnetic proportional flow-rate control valve 40 is connected to an oil tank 44. At position II, an oil path 42 is connected with the electromagnetic proportional flow-rate control valve 40 through an oil path 43.

The electromagnetic change-over valve 45 goes into positions I and II by the actuation of the solenoid a. The electromagnetic change-over valve 45 is made to go into position II at the time of opening and closing the mold. During that time, oil is taken into or discharged from between the oil chamber 37 and an oil tank 49 through a prefill valve 47 having pilot check. The electromagnetic change-over valve 45 is made to go into position II at the time of closing the mold, and oil is supplied to the oil chamber 37 via oil passage 46 for clamping the mold through the electromagnetic change-over valve 38. The above-described electromagnetic change-over valves 38, 41, and 45 are constructed only so as to be switched, and their resistance to passage is small.

The mold clamping cylinder 31 has the large-diameter rod 33 and the small-diameter rod 34 on opposing sides of the piston 32, as described above. The two of them constitute oil chambers 35, 36, and 37. When pressure areas at the oil chambers 35, 36, and 37 are represented respectively as $A_1$, $A_2$, and $A_3$, pressure area $A_3$ is a value sufficient to generate a mold clamping force and pressure area $A_2$ is a value sufficient to generate a mold releasing force. To move the mold, an oil pressure is applied to pressure areas $A_1$ and $A_2$. The pressure area $A_1$ is made half of the pressure area $A_2$, and a differential circuit is also used at the time of opening the mold.

At the time of releasing the mold by the mold clamping apparatus constructed as described above, the electromagnetic change-over valve 38 is made to go into position II, the prefill electromagnetic change-over valve 45 is made to go into position II, and the electromagnetic change-over valve 41 is made to go into position I. In this state, oil discharged from the variable capacity pump 39 is supplied to the oil chamber 36, whereas the oil in the oil chamber 35 is released to an oil tank 44 via the electromagnetic change-over valve 38, the electromagnetic proportional flow-rate control valve 40, and the electromagnetic change-over valve 41.

Since the pressure in an oil path 48 is high, the prefill valve 47 having pilot check is opened due to a pilot pressure received. The oil inside the oil chamber 37 is released to the oil tank 49 through the prefill valve 47 having pilot check.

At the time of opening the mold, the electromagnetic change-over valves 38, 41, and 45 are made to go into position II. The electromagnetic proportional flow-rate control valve 40 is placed in a fully open state. At this time, the oil inside the oil chamber 35 is supplied to the oil path 42 through the electromagnetic change-over valve 38, the electromagnetic proportional flow-rate control valve 40, and the electromagnetic change-over valve 41, and supplied to the oil chamber 36 again via the electromagnetic change-over valve 38. In this way, a differential circuit operated by pressure areas $A_1$ and $A_2$ is formed. The piston 32 moves in the leftward direction in the figure, and a maximum speed for opening the mold can be obtained.

In the hydraulic circuit constructed as described above, when the piston 32 moves, its movement stroke is detected by a displacement sensor 51. A displacement signal from the displacement sensor 51 is sent to a control apparatus 52. The electromagnetic proportional flow-rate control valve 40, and the variable capacity pump 39 are controlled by a control signal from the control apparatus 52.

In the mold opening/closing control apparatus constructed as described above, however, a great shock occurs if a differential circuit is formed while the piston 32 is moving after the mold opening is started. Therefore, the mold opening/closing control apparatus cannot be used for positional control requiring a high degree of precision.

SUMMARY OF THE INVENTION

The present invention has been devised to solve the above-described problems. It is accordingly an object of the present invention to provide a mold opening/closing control apparatus in which switching to a differential circuit while a piston is being moved can be performed smoothly.

According to the present invention, a hydraulic circuit, in which a meter-in circuit and a differential circuit are combined, is connected to a mold opening/closing cylinder, and oil is supplied from a variable capacity pump. Thus, the mold opening/closing cylinder is operated.

Speed instruction signals are integrated and made to be a position instruction signal. A positional deviation is determined from the position instruction signal and an actual displacement of the mold opening/closing cylinder. A flow-rate instruction signal is set by the positional deviation.

In such a case, when a differential switching determining section receives the above positional deviation, it compares the positional deviation with a reference value and determines whether differential switching should be performed. A differential change-over valve is connected to the differential switching determining section. When it receives a signal from the differential switching determining section, the meter-in circuit and the differential circuit are selected. Also, a gain switching section is connected to the differential switching determining section. It switches between a gain for the meter-in circuit and a gain for the differential circuit in response to the reception of the positional deviation and a signal from the differential switching determining section. Therefore, a minimum variable capacity pump can be used, and a smooth switching between the meter-in circuit and the differential circuit can be made possible. Therefore, smooth acceleration/deceleration can be made possible.

A fixed capacity pump can be connected to the variable capacity pump. In such a case, because it has an un-load and on-load determining section, it receives a flow-rate instruction signal from the gain switching section and compares it with a reference value to determine whether switching between un-loading and on-loading should be performed so that the switching will be performed. Therefore, a flow-rate instruction signal of a variable capacity pump can be made small, and the variable capacity pump can be further miniaturized.

These and other objects, features and advantages of the present invention will become clear when reference is made to the following description of the preferred embodiments of the present invention, together with reference to the accompanying drawings.

DESCRIPTION OF PREFERRED EMBODIMENT

Figure 1:
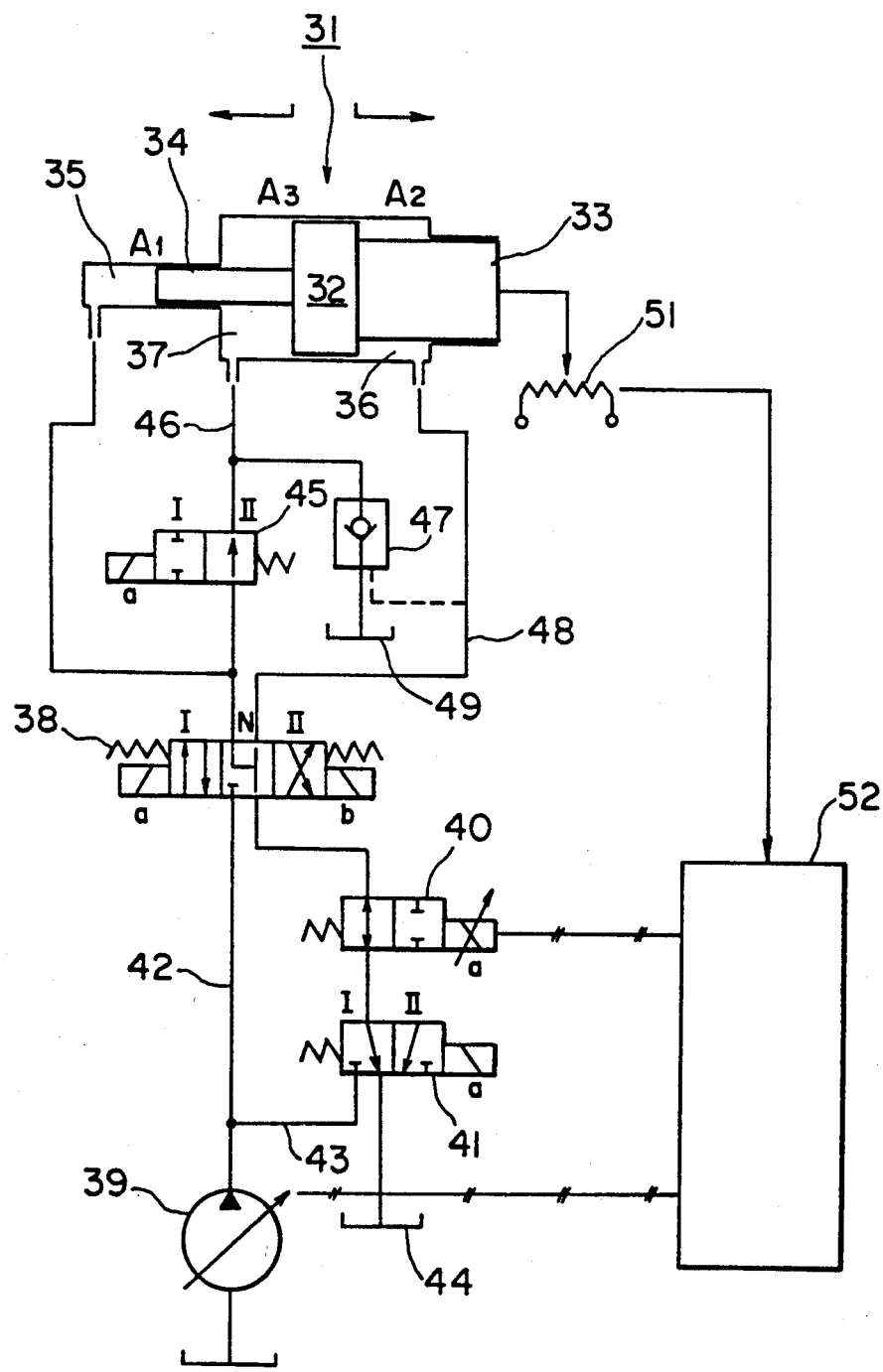
FIG. 1 is a view showing a mold opening/closing control apparatus in which a differential circuit is used.
Figure 2:
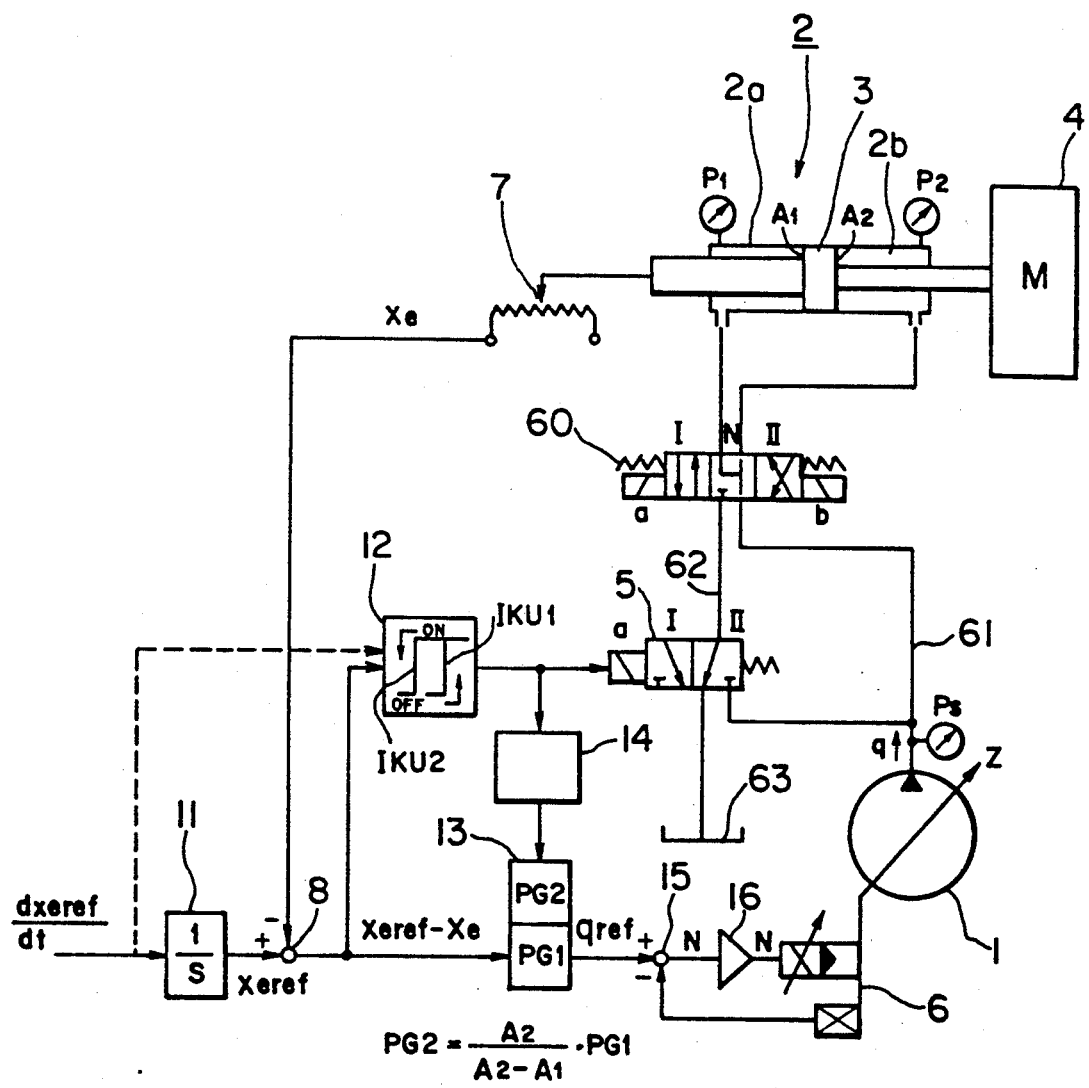
FIG. 2 is a schematic view showing a mold opening/closing control apparatus of an embodiment of the present invention.
Figure 3:
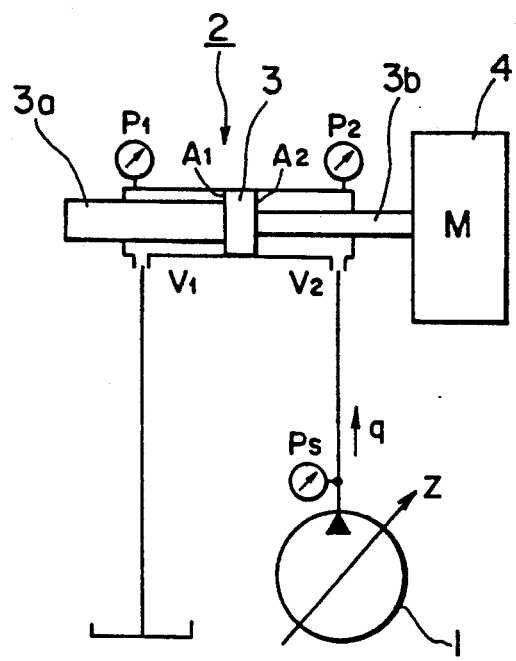
FIG. 3 is a view showing a meter-in circuit.
Figure 4:
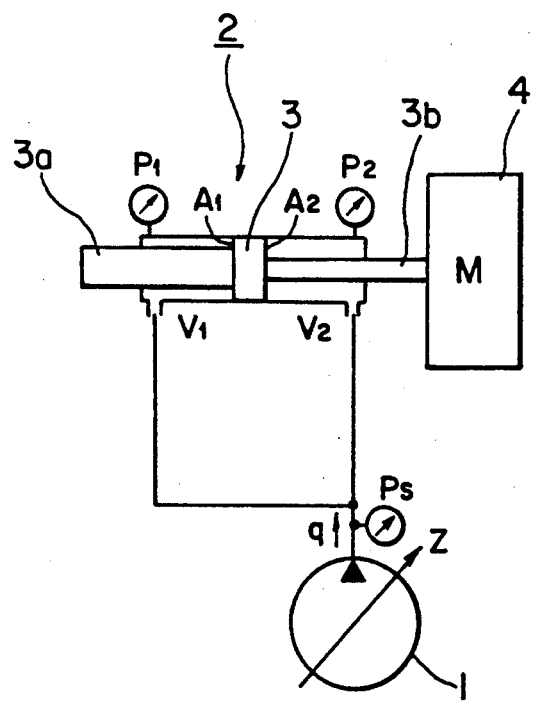
FIG. 4 is a view showing a differential circuit.

An embodiment of the present invention will be explained below in detail with reference to the accompanying drawings. FIG. 2 is a schematic view showing a mold opening/closing control apparatus of an embodiment of the present invention. FIG. 3 is a view showing a meter-in circuit. FIG. 4 is a view showing a differential circuit.

In FIG. 3, reference numeral 1 denotes a variable capacity pump; reference numeral 2 denotes a mold opening/closing cylinder to which oil from the variable capacity pump 1 is supplied; reference numeral 3 denotes a piston of the mold opening/closing cylinder 2; and reference numeral 4 denotes a movable platen operated by the mold opening/closing cylinder 2. In this case, the mold opening/closing cylinder 2 is disposed independently of an unillustrated mold clamping cylinder.

A small-diameter rod 3b is attached to the movable platen 4 of the piston 3; a large-diameter rod 3a is attached to a side opposite to the movable platen 4. A pressure area of the piston 3 on the large-diameter rod 3a is represented as $A_1$ and that on the small-diameter rod 3b is represented as $A_2$.

The driving force of the mold opening/closing cylinder 2 required at the time of opening the mold is given by the product of the pressure area $A_2$ and a discharge pressure $P_3$ of the variable capacity pump 1. The velocity of the piston 3 is determined by dividing the discharge flow rate q of the variable capacity pump 1 by the pressure area $A_2$. Regarding the differential circuit of FIG. 4, although the driving force of the mold opening/closing cylinder 2 is smaller than that of the meter-in circuit in FIG. 3 because a pressure area is equivalent to $A_2-A_1$, the velocity of the piston 3 is higher.

Therefore, by properly setting the pressure areas $A_1$ and $A_2$ and by performing switching between the meter-in circuit and the differential circuit, the driving force and velocity required for the mold opening/closing cylinder 2 are realized from the discharge pressure $P_s$ and the discharge flow rate q of the variable capacity pump 1 having a minimum amount of capacity.

In FIGS. 3 and 4, the variable capacity pump 1 is connected to only one of the oil chambers of the piston 3 so that mold opening only is performed. An electromagnetic change-over valve (not shown) is disposed between the variable capacity pump 1 and the mold opening/closing cylinder 2. Oil from the variable capacity pump 1 is selectively supplied to one of the oil chambers on either side of the piston 3, so that mold opening/closing can be performed.

In FIG. 2, reference numeral 1 denotes a variable capacity pump which is capable of changing the amount of oil discharged; reference numeral 2 denotes a mold opening/closing cylinder, in which a piston 3 is slidably disposed. The piston 3 reciprocates by the operation of the mold opening/closing cylinder 2 to cause a metal mold to be opened/closed by using the movable platen 4.

Reference numeral 60 denotes an electromagnetic change-over valve which can be switched by solenoids a and b; reference numeral 61 denotes an oil path on a supply side, connected between the discharge side of the variable capacity pump 1 and the electromagnetic change-over valve 60, through which oil discharged from the variable capacity pump 1 flows, reference numeral 62 denotes an oil path on a return side, connected between the electromagnetic change-over valve 60 and a differential change-over valve 5, through which oil recovered from the mold opening/closing cylinder 2 flows.

Oil chambers 2a and 2b are formed on opposing sides of the piston 3, and are selectively connected to the oil path 61 on the supply side and the oil path 62 on the return side via the electromagnetic change-over valve 60. The electromagnetic change-over valve 60 is switched by the actuation of the solenoids a and b. The ports of the electromagnetic change-over valve 60 are individually connected to the oil chambers 2a and 2b, the variable capacity pump 1, and the differential change-over valve 5. When the solenoid a is driven, the electromagnetic change-over valve 60 goes into position I; when the solenoid b is driven, the electromagnetic change-over valve 60 goes into position II. Position N is a neutral position. When the electromagnetic change-over valve is at position I, with the oil path 61 on the supply side connected to the oil chamber 2b and an oil path 62 on the return side connected to the oil chamber 2a, the movable platen 4 is moved in the leftward direction by means of the piston 3, and the mold is opened. At position II, with the oil path 61 on the supply side connected to the oil chamber 2a and an oil path 62 on the return side connected to the oil chamber 2b, the movable platen 4 is moved in the rightward direction by means of the piston 3, and the mold is closed. At position N, a spool is placed in a neutral state, and the mold opening/closing cylinder 2 stops.

The differential change-over valve 5 comprises an electromagnetic change-over valve operated by the solenoid a. It goes into positions I and II in response to the reception of an electrical signal. At position I, with the oil path 61 on the supply side connected to the oil path 62 on the return side, a differential circuit is formed. At position II, with the oil path 62 on the return side connected to the oil tank 63, a meter-in circuit is formed.

Reference numeral 6 denotes a swash plate whose inclination angle is changed on the basis of an instruction signal which changes the amount of discharge from the variable capacity pump 1.

The piston 3 of the mold opening/closing cylinder 2 is connected to a displacement sensor 7, which detects the stroke of the movement of the piston 3 and sends a displacement signal $x_e$ to a subtracter 8.

Reference numeral 11 denotes an integrator to which a velocity instruction signal $dx_{er\,ef}/dt$ is input. Regarding movement characteristics when the mold is being opened, it is desirable that the piston 3 moves at a velocity of $dx_e/dt$ proportional to a velocity instruction signal $dx_{er\,ef}/dt$, and it stops at a specified position with a high degree of precision. Therefore, a position instruction signal $x_{er\,ef}$ is generated by the integrator 11, the displacement signal $x_e$ is fed back to the position instruction signal $x_{er\,ef}$, and a positional deviation $x_{er\,ef}-x_e$ is determined. The positional deviation $x_{er\,ef}-x_e$ is input to a differential switching determining section 12 and a gain switching section 13.

A flow-rate instruction signal $q_{re\,f}$ from the variable capacity pump 1 can be obtained by multiplying the positional deviation $x_{er\,ef}-x_e$ by pump gains PG1 and PG2 set by the gain switching section 13. Because the mold opening/closing control apparatus basically performs closed loop control based on the position of the piston 3, a high degree of accuracy in coming to a stop can be obtained, and the piston 3 can move at a velocity proportional to the velocity instruction signal $dx_{er\,ef}/dt$. The flow-rate instruction signal $q_{re\,f}$ changes smoothly because of the setting of the pump gains PG1 and PG2, with the result that an increase at the time of acceleration or deceleration can be lowered.

The differential switching determining section 12 is provided to select the meter-in circuit of FIG. 3 when the piston 3 moves at a low speed, and to select the differential circuit of FIG. 4 when the piston 3 moves at a high speed. The differential switching determining section 12 goes on or off by the positional deviation $x_{er\,ef}-x_e$, causing the differential change-over valve 5 to be switched into position I or II.

In a conventional mold opening/closing control apparatus, switching is performed by the velocity instruction signal $dx_{er\,ef}/dt$, as shown by the broken line. Since closed loop control is performed on the basis of the integration of the velocity instruction signal $dx_{er\,ef}/dt$, a delay between the velocity instruction signal $dx_{er\,ef}/dt$ and an actual velocity $dx_e/dt$ signal is problematical.

For this reason, the inventor has taken notice that the flow-rate instruction signal $q_{re\,f}$ is proportional to the positional deviation $x_{er\,ef}-x_e$ and, further, that the velocity $dx_e/dt$ is statically proportional to the positional deviation $x_{er\,ef}-x_e$. As shown by the solid line of FIG. 2, differential switching is determined by the positional deviation $x_{er\,ef}-x_e$.

The differential switching determining section 12 has hysteresis for the purpose of preventing switch hunting. If the differential circuit is selected as a result of determining differential switching, an instruction is provided to the differential change-over valve 5 and a hydraulic circuit is switched. At the same time, an instruction is also provided to the gain switch section 13. Switching is performed from the pump gain PG1 for the meter-in circuit to the pump gain PG2 for the differential circuit. The two pump gains PG1 and PG2 have the following relationship;

$$PG2 = A_2 \cdot PG1/(A_2 - A_1).$$

As a result, the flow-rate instruction signal $q_{re\,f}$ for the positional deviation $x_{er\,ef}-x_e$ is lowered.

Figure 5:
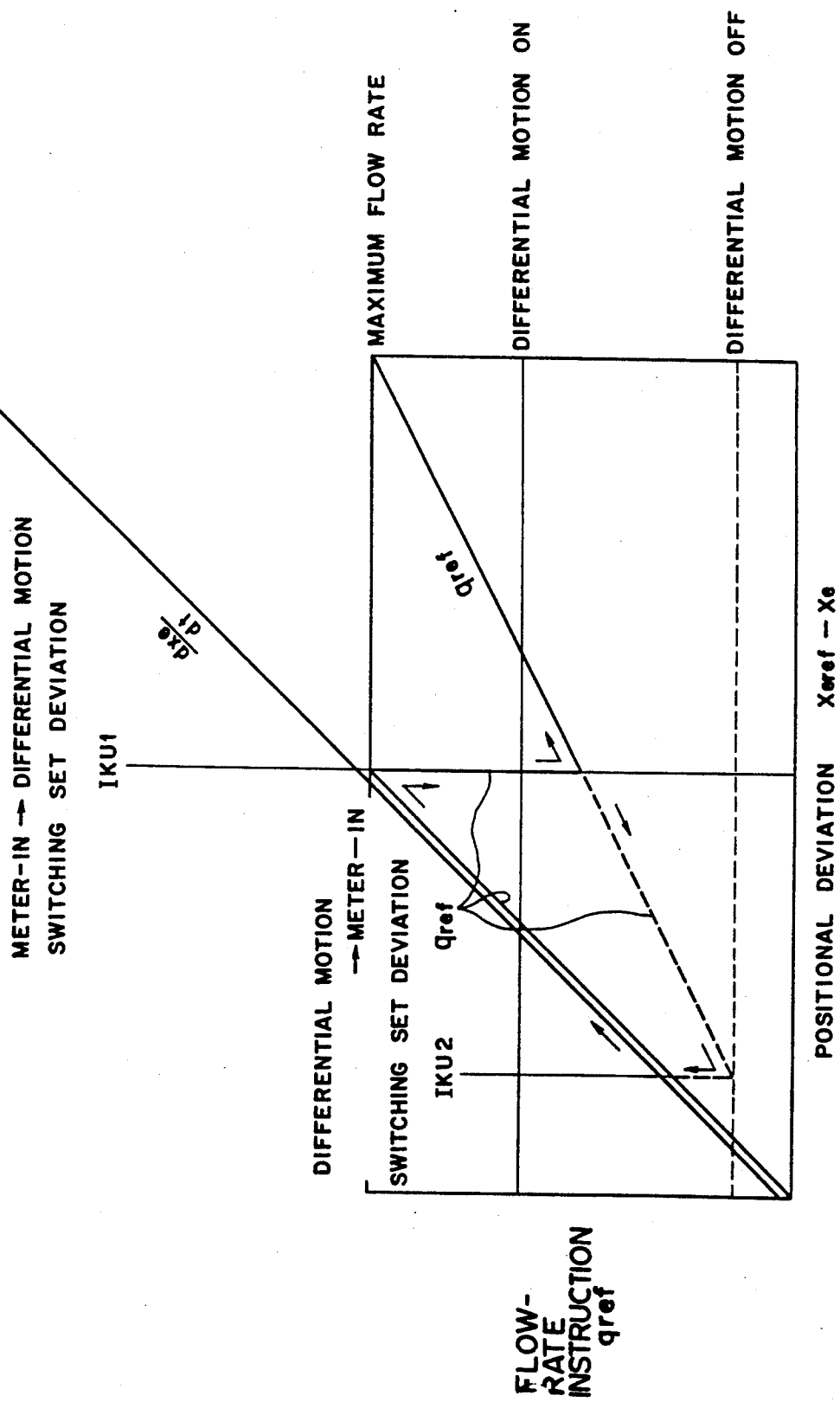
FIG. 5 is a view showing the relationship between the positional deviation and the flow-rate instruction of the mold opening/closing control apparatus of the present invention.

FIG. 5 is a view showing the relationship between the positional deviation and flow-rate instruction of the mold opening/closing control apparatus of the present invention.

The differential circuit is turned on when the positional deviation $x_{er\,ef}-x_e$ becomes the value of IKU1 and turned off when the positional deviation $x_{er\,ef}-x_e$ becomes IKU2. As shown in FIG. 5, the differential circuit is turned on when the variable capacity pump 1 is at a maximum of flow rate, thereby lowering the flow-rate instruction signal $q_{re\,f}$. A velocity of $dx_e/dt$ which can ultimately be obtained may be represented by a straight line shown in FIG. 5.

Because a fixed amount of time is required to make the differential change-over valve 5 operate, a timing adjustment section 14 is disposed to perform at the same time the pump gains PG1 and PG2 are switched in the gain switching section 13. Timing adjustment is performed by allowing idle time. Reference numeral 15 denotes a subtracter for making minor feedback adjustment; and reference numeral 16 denotes an amplifier.

In the mold opening/closing control apparatus constructed as described above, the variable capacity pump 1 has a function for outputting a discharge flow rate q corresponding to the flow-rate instruction signal $q_{re\,f}$. However, if the variable capacity pump 1 is combined with a fixed capacity pump, costs can be reduced more than when a large variable capacity pump 1 or a plurality of variable capacity pumps are used.

Next, an explanation will be provided for when the variable capacity pump 1 and a fixed capacity pump are combined.

Figure 6:
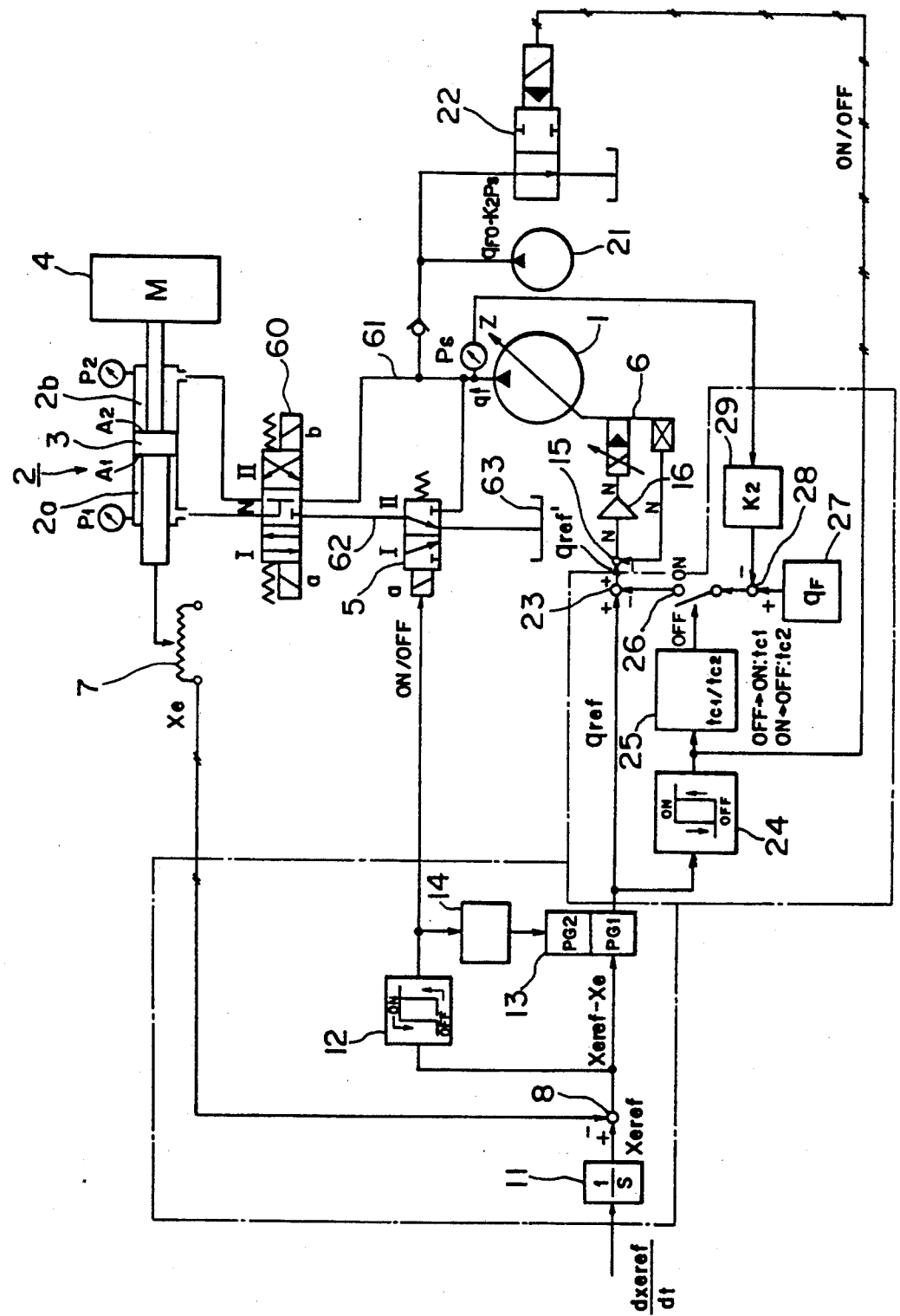
FIG. 6 is a schematic view showing a mold opening/closing control apparatus of another embodiment of the present invention.

FIG. 6 is a schematic view of a mold opening/closing control apparatus showing another embodiment of the present invention.

In FIG. 6, reference numeral 1 denotes a variable capacity pump; reference numeral 2 denotes a mold opening/closing cylinder, in which a piston 3 is slidably disposed. The piston 3 reciprocates by the operation of the mold opening/closing cylinder 2 to cause a metal mold to be opened/closed by using the movable platen 4.

Reference numeral 60 denotes an electromagnetic change-over valve which can be switched by solenoids a and b; reference numeral 61 denotes an oil path on a supply side, connected between the discharge side of the variable capacity pump 1 and an electromagnetic change-over valve 60, through which oil discharged from the variable capacity pump 1 flows; reference numeral 62 denotes an oil path on a return side, connected between the electromagnetic change-over valve 60 and a differential change-over valve 5, through which oil recovered from the mold opening/closing cylinder 2 flows.

Oil chambers 2a and 2b are formed on opposing sides of the piston 3. The oil chambers 2a and 2b are selectively connected to the oil path 61 on the supply side and the oil path 62 on the return side via the electromagnetic change-over valve 60. The electromagnetic change-over valve 60 is switched by the actuation of the solenoids a and b. The ports of the electromagnetic change-over valve 60 are individually connected to the oil chambers 2a and 2b, the variable capacity pump 1, and the differential change-over valve 5. When the solenoid a is driven, the electromagnetic change-over valve 60 is made to go into position I; when the solenoid b is driven, the electromagnetic change-over valve 60 is made to go into position II. Position N is a neutral position. At position I, with the oil path 61 on the supply side connected to the oil chamber 2b and the oil path 62 on the return side connected to the oil chamber 2a, the movable platen 4 is moved in the leftward direction by means of the piston 3, and the mold is opened. At position II, with the oil path 61 on the supply side connected to the oil chamber 2a and the oil path 62 on the return side connected to the oil chamber 2b, the movable platen 4 is moved in the rightward direction by means of the piston 3, and the mold is closed. At position N, a spool is placed in a neutral state, and the mold opening/closing cylinder 2 stops.

The differential change-over valve 5 comprises an electromagnetic change-over valve operated by the solenoid a. It goes into positions I and II in response to the reception of an electrical signal. At position I, with the oil path 61 on the supply side connected to the oil path 62 on the return side, a differential circuit is formed. At position II, with the oil path 62 on the return side connected to the oil tank 63, a meter-in circuit is formed.

Reference numeral 6 denotes a swash plate whose inclination angle is changed on the basis of an instruction signal which changes the amount of discharge from the variable capacity pump 1.

The piston 3 of the mold opening/closing cylinder 2 is connected to a displacement sensor 7, which detects the stroke of the movement of the piston 3 and sends a displacement signal $x_e$ to a subtracter 8.

Reference numeral 11 denotes an integrator to which a velocity instruction signal $dx_{er\ ef}/dt$ is input. The displacement signal $x_e$ is fed back to the position instruction signal $x_{er\ ef}$, and a positional deviation $x_{er\ ef}-x_e$ is determined. The positional deviation $x_{er\ ef}-x_e$ is input to the differential switching determining section 12 and the gain switching section 13.

A flow-rate instruction signal $q_{re\ f}$ from the variable capacity pump 1 can be obtained by multiplying the positional deviation $x_{er\ ef}-x_e$ by pump gains PG1 and PG2 set by the gain switching section 13.

The differential switching determining section 12 is provided to select the meter-in circuit of FIG. 3 when the piston 3 moves at a low speed, and to select the differential circuit of FIG. 4 when the piston 3 moves at a high speed. The differential switching determining section 12 goes on or off by the positional deviation $x_{er\ ef}-x_e$, causing the differential change-over valve 5 to be switched into positions I or II.

If the differential circuit is selected as a result of determining differential switching by the differential switching determining section 12, an instruction is provided to the differential change-over valve 5 and a hydraulic circuit is switched. At the same time, an instruction is also provided to the gain switching section 13. Switching is performed from the pump gain PG1 for the meter-in circuit to the pump gain PG2 for the differential circuit. In order to make the differential change-over valve 5 operate, a fixed amount of time is required. Therefore, a timing adjustment section 14 is disposed to perform at the same time the pump gains PG1 and PG2 are switched in the gain switching section 13. Timing adjustment is performed by allowing idle time. Reference numeral 15 denotes a subtracter for making minor feedback adjustment; and reference numeral 16 denotes an amplifier.

In the mold opening/closing control apparatus of FIG. 6, a fixed capacity pump 21 and an un-load/on-load change-over valve 22 are added as a hydraulic circuit to the mold opening/closing control apparatus of FIG. 2. The flow-rate instruction signal $q_{ref}$ obtained by the gain switching section 13 is sent to a subtracter 23 and un-load/on-load determining section 24.

Figure 7:
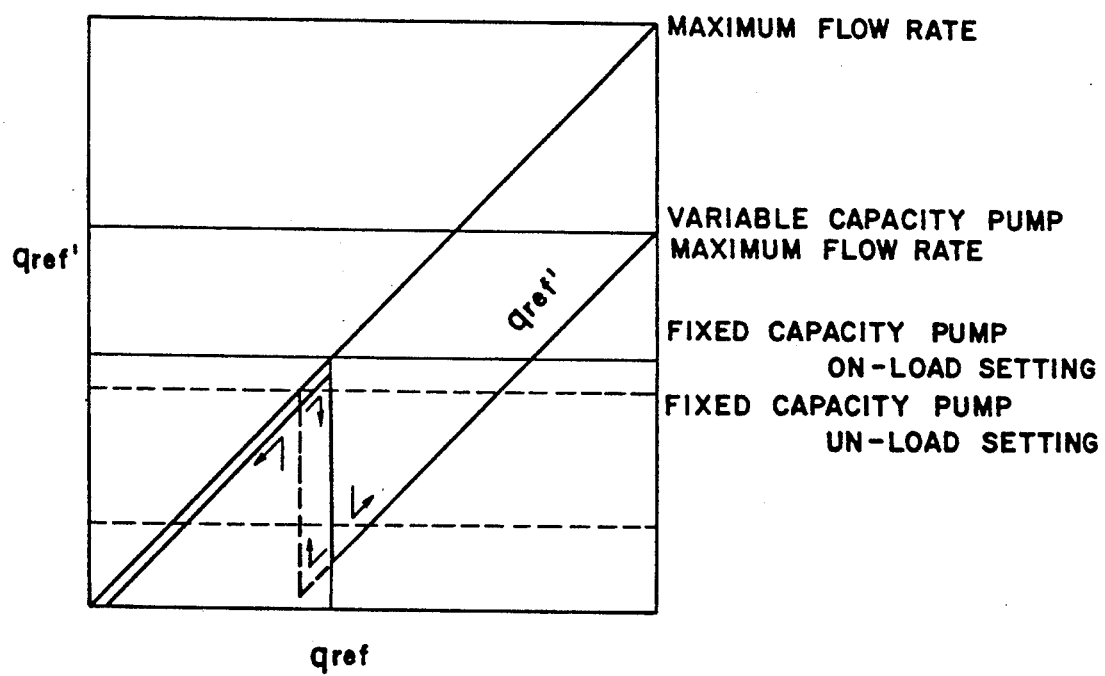
FIG. 7 is a view showing the relationship between a first flow-rate instruction signal to an un-load/on-load determining section and a second flow-rate instruction signal to a variable capacity pump.

FIG. 7 is a view showing the relationship between a first flow-rate instruction signal to the un-load/on-load determining section and a second flow-rate instruction signal to the variable capacity pump.

The un-load/on-load determining section 24 has hysteresis for the purpose of preventing switch hunting. When the level of the flow-rate instruction signal $q_{ref}$ (a first flow-rate instruction signal) is raised and reaches a set value, the un-load/on-load determining section 24 issues an on-load command to the un-load/on-load change-over valve 22, causing the fixed capacity pump 21 to be activated. As a result, the oil discharged from the fixed capacity pump 21 merges with the oil discharged from the variable capacity pump 1 and is sent to the oil chamber 2b. At the same time, a value corresponding to the amount of oil discharged from the fixed capacity pump 21 is subtracted from the flow-rate instruction signal $q_{ref}$ of the variable capacity pump 1.

At this point, to compensate for the difference in response between the variable capacity pump 1 and the un-load/on-load change-over valve 22, the output of the un-load/on-load determining section 24 is sent out to a switch 26 via an idle time setter 25.

The discharge amount $q_{FO}$ of the fixed capacity pump 21 is set by a setter 27, a compensation calculation for leakage in the fixed capacity pump 21 is performed by a subtracter 28, and the amount is sent to the subtracter 23 via the switch 26. That is, leakage proportional to the pressure $P_s$ on the discharge side occurs in the fixed capacity pump 21. Therefore, an actual discharge amount becomes $q_{FO}-K_2 \cdot P_s$, and the total flow-rate characteristics become uncontinuous at a switching point because operating conditions vary even if the value of a signal output from the un-load/on-load determining section 24 is adjusted.

For this reason, a command sent to the subtracter 23 is the actual discharge amount $q_{FO}-K_2 \cdot P_s$. The discharge amount $q_{FO}-K_2 \cdot P_s$ is subtracted from the flow-rate instruction signal $q_{ref}$ from the gain switching section 13, and it is made to be a flow-rate instruction signal $q_{ref}'$ (a second flow-rate instruction signal) to the variable capacity pump 1.

The switch 26 is turned on or off after a predetermined idle time has elapsed. What is more, an idle time $t_{c1}$ is set when the switch 26 is switched off from on; an idle time $t_{c2}$ is set when the switch 26 is switched on from off.

In this way, switching from the variable capacity pump 1 to the fixed capacity pump 21, or vice versa, can be performed smoothly.

Figure 8:
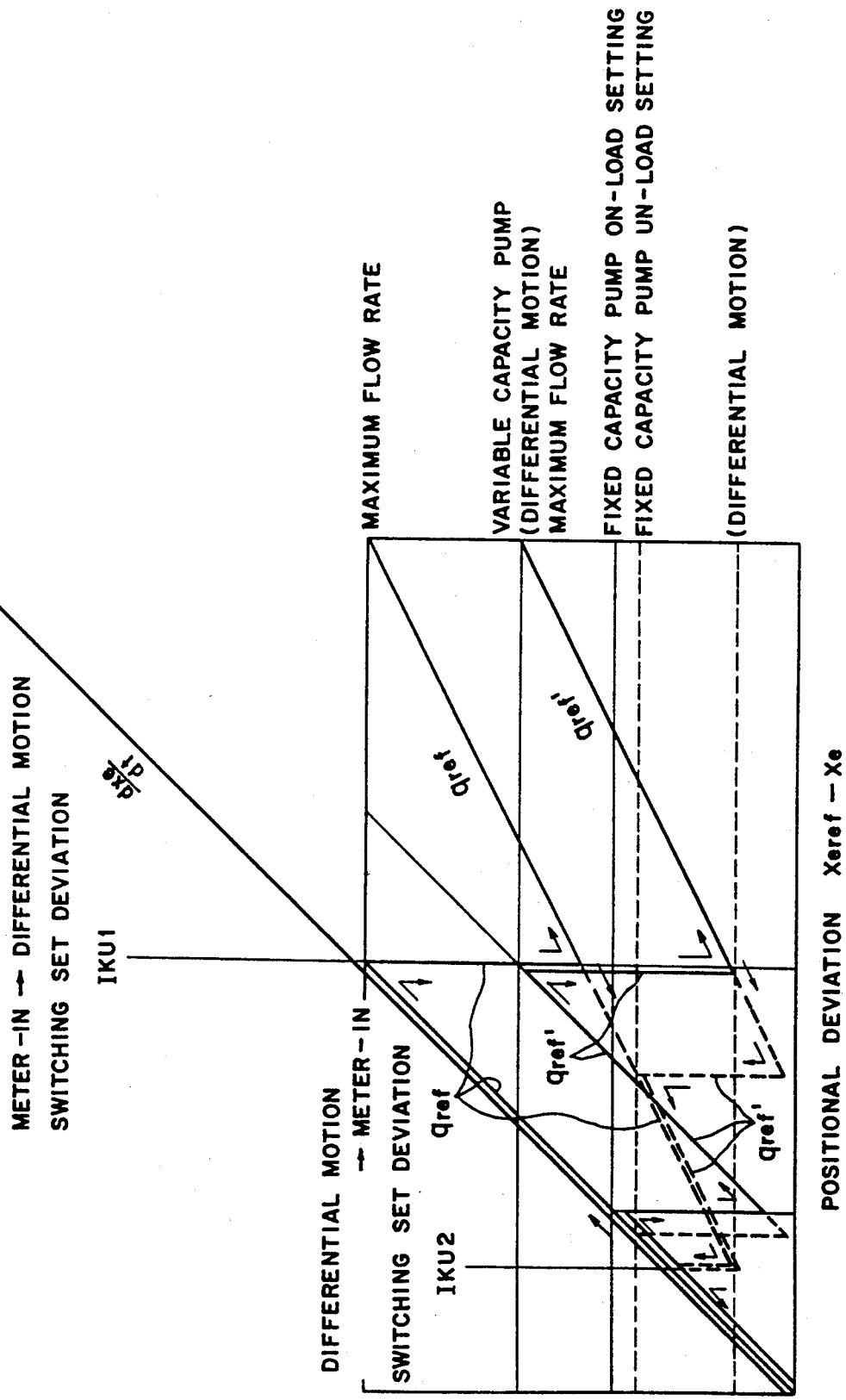
FIG. 8 is a view showing the relationship between the positional deviation and the flow-rate instruction of the mold opening/closing control apparatus of another embodiment of the present invention.

FIG. 8 is a view showing the relationship between the positional deviation and the flow-rate instruction signal of the mold opening/closing control apparatus of another embodiment of the present invention.

In FIG. 8, the difference between the first flow-rate instruction signal $q_{ref}$ and the second flow-rate instruction signal $q_{ref}'$ is the discharge amount of the fixed capacity pump 21. When switching from the meter-in circuit to the differential circuit is performed, pump gains PG1 and PG2 are switched, as described above, and the flow-rate instruction signal $q_{ref}$ is lowered according to the ratio of pressure areas. Conversely, when switching from the differential circuit to the meter-in circuit is performed, the level of the flow-rate instruction signal $q_{ref}$ is raised. At this time, to prevent hunting at the time when the un-load/on-load of the fixed capacity pump 21 is switched, reference values for determining differential switching by the differential switching determining section 12 and for determining un-load-/on-load switching by the un-load/on-load determining section 24 are set.

That is, the above reference values are set so that the flow rate after switching from the differential circuit to the meter-in circuit is performed becomes smaller than the on-load set flow rate of the fixed capacity pump 21. They are also set so that the flow rate after switching from the meter-in circuit to the differential circuit is performed becomes larger than the un-load set flow rate of the fixed capacity pump 21.

Many different embodiments of the present invention can be made without departing from the spirit and scope thereof; therefore, it is to be understood that this invention is not limited to the specific embodiments described above and is solely defined in the appended claims.

What is claimed is:

1. A mold opening/closing control apparatus for opening/closing a metal mold, said control apparatus comprising:
   (a) a hydraulic circuit comprising:
      (i) a mold opening/closing cylinder with a first and a second oil chamber formed on opposite sides of a piston and with the piston connected to a movable platen by way of a rod;
      (ii) a variable capacity pump for supplying an amount of oil to said first or second oil chamber;
      (iii) a supply side oil path through which oil is supplied from the variable capacity pump to one of said first and second oil chambers;
      (iv) a return side oil path through which oil is discharged from the other of said first and second oil chambers;
      (v) oil path switching means for selectively connecting the supply side oil path to either of said first and second oil chambers; and
      (vi) differential switching means for switching between a first position wherein a differential circuit is established by connecting the return side oil path to the supply side oil path and a second position wherein a meter-in circuit is established by connecting the return side oil path to an oil tank; and
   (b) a control device comprising:
      (i) differential switching determining means for determining switching of said differential switching means in accordance with position of the movable platen;
      (ii) gain means for generating a flow-rate instruction signal by multiplying the positional deviation by a pump gain; and
      (iii) means for changing the amount of oil discharged from the variable capacity pump responsive to said flow-rate instruction signal.

2. The mold opening/closing control apparatus as claimed in claim 1, wherein the oil path switching means and the differential switching means each comprise an electromagnetic change-over valve.

3. The mold opening/closing control apparatus as claimed in claim 1, wherein the differential switching determining means comprises a displacement sensor for detecting displacement of the movable platen, integration means for integrating a velocity instruction signal and obtaining a position instruction signal, means for generating the position instruction signal and determining positional deviation responsive to the detected displacement of the movable platen, and means for comparing the positional deviation with a reference value.

4. The mold opening/closing control apparatus as claimed in claim 1, wherein the gain means comprises gain switching means for switching between a pump gain for the meter-in circuit and a pump gain for the differential circuit in response to reception of a signal indicating the determination of the differential switching determining means.

5. The mold opening/closing control apparatus as claimed in claim 3, wherein the gain means comprises gain switching means for switching between a pump gain for the meter-in circuit and a pump gain for a differential circuit in response to reception of a signal indicating the determination of the differential switching determining means.

6. The mold opening/closing control apparatus as claimed in claim 4, further comprising means for timing the switching of the differential change-over valve and for timing the switching of the gain switching means.

7. The mold opening/closing control apparatus as claimed in claim 5, further comprising means for timing the switching the differential change-over valve and for timing the switching of the gain switching means.

8. A mold opening/closing control apparatus for opening/closing a metal mold, said control apparatus comprising:
   (a) a hydraulic circuit comprising:
      (i) a mold opening/closing cylinder with a first and a second oil chamber formed on opposite sides of a piston and with the piston connected to a movable platen by a rod;
      (ii) a variable capacity pump for supplying an amount of oil to said first or second oil chamber;
      (iii) a fixed capacity pump disposed in parallel with said variable capacity pump;
      (iv) an un-load/on-load change-over valve for switching the fixed capacity pump between un-load and on-load states;
      (v) a supply side oil path through which oil is supplied from the variable capacity pump and the fixed capacity pump to one of said first and second oil chambers;
      (vi) a return side oil path through which oil is discharged from the other of said first and second oil chambers;
      (vii) oil path switching means for selectively connecting the supply side oil path to either of said first and second oil chambers;
      (viii) differential switching means for switching between a first position wherein a differential circuit is established by connecting the return side oil path to the supply side oil path and a second position wherein a meter-in circuit is established connecting the return side oil path to an oil tank; and
   (b) a control device comprising:
      (i) differential switching determining means for determining switching of said differential switching means in accordance with position of the movable platen;
      (ii) gain means for generating a first flow-rate instruction signal by multiplying the positional deviation by a pump gain;

(iii) an un-load/on-load determining means for comparing the first flow-rate instruction signal with a reference value and determining the switching between un-load and on-load on the basis of said comparing;

(iv) flow-rate instruction signal changing means for changing the first flow-rate instruction signal in accordance with the determination from the un-load/on-load determining means to produce a second flow-rate instruction signal; and (v) means for changing the amount of oil discharged from the variable capacity pump in response to said second flow-rate instruction signal.

9. The mold opening/closing control apparatus as claimed in claim 8, wherein the oil path switching means and the differential switching means each comprise an electromagnetic change-over valve.

10. The mold opening/closing control apparatus as claimed in claim 8, wherein the differential switching determining means comprises a displacement sensor for detecting displacement of the movable platen, integration means for integrating a velocity instruction signal and obtaining a position instruction signal, means for generating the position instruction signal and determining positional deviation responsive to the detected displacement of the movable platen, and means for comparing the positional deviation with a reference value.

11. The mold opening/closing control apparatus as claimed in claim 8, wherein the gain means comprises gain switching means for switching between a pump gain for the meter-in circuit and a pump gain for the differential circuit in response to reception of a signal indicating the determination of the differential switching determining means.

12. The mold opening/closing control apparatus as claimed in claim 10, wherein the gain means comprises gain switching means for switching between a pump gain for the meter-in circuit and a pump gain for the differential circuit in response to reception of a signal indicating the determination of the differential switching determining means.

13. The mold opening/closing control apparatus as claimed in claim 8, further comprising means for timing the switching of the differential change-over value and timing the switching of the gain switching means.

14. The mold opening/closing control apparatus as claimed in claim 10, further comprising means for timing the switching of differential change-over valve and for timing the the switching of the gain switching means.

* * * * *